United States Patent [19]
Doane

[11] 3,977,261
[45] Aug. 31, 1976

[54] WRAP-SPRING, VARIABLE SPEED DRIVE ARRANGEMENT

[76] Inventor: Tuthill Saunders Doane, 373 School St., Westbury, L. I., N.Y. 11590

[22] Filed: Aug. 29, 1974

[21] Appl. No.: 501,474

[52] U.S. Cl. .............................. 74/88; 192/48.92
[51] Int. Cl.² ......................................... F16H 27/02
[58] Field of Search ............... 74/45, 88; 192/48.92

[56] References Cited
UNITED STATES PATENTS

| | | | |
|---|---|---|---|
| 2,548,807 | 4/1951 | Morgan et al. ....................... | 74/41 |
| 3,389,611 | 6/1968 | Bey ....................................... | 74/88 |

*Primary Examiner*—Samuel Scott
*Assistant Examiner*—Wesley S. Ratliff, Jr.

[57] ABSTRACT

Oscillatory motion of a first end of a lever arm is converted to incremental rotational motion of an output shaft connected to a second end of the lever arm. The second end oscillates with an amplitude determined by a fulcrum adjustable along the lever arm. The output shaft is coupled to the second end of the lever arm by a wrapped spring arrangement.

2 Claims, 4 Drawing Figures

WRAP-SPRING, VARIABLE SPEED DRIVE ARRANGEMENT

FIELD OF THE INVENTION

This invention relates to a wrap-spring variable drive arrangement for transmitting motion to a drive shaft.

BACKGROUND OF THE INVENTION

The use of spring drive arrangements for delivering power are well known in the art. Typically, the spring is attached to an output shaft of a power source at one end and to an ("input") shaft of an electric motor at the other. The input shaft is operative to wind the spring which, in turn, applies a rotational motion to the output shaft.

BRIEF DESCRIPTION OF THE INVENTION

The present invention is directed at a wrap-spring drive which employs a lever action to provide a speed control. A power source such as an electric motor is directly coupled to a first end of a lever arm by means of an eccentric on the drive shaft of the motor so that the rotation of the shaft results in oscillation of the first end of the lever arm thus the shaft of the motor becomes the input (shaft) for the lever herein. The lever arm is supported by a fulcrum which is adjustable along the length of the lever arm. First and second springs are connected to the second end of the lever arm and are tightly wrapped about an output shaft in a manner to convert the oscillations of the second end to incremental rotations of the output shaft in a first direction.

The movement of the fulcrum closer to or further away from the second end results in decreased or increased amplitude in the oscillation of that end, respectively. The change in amplitude, in turn, results in a corresponding change in the speed of rotation of the output shaft.

DETAILED DESCRIPTION

Figure 1:
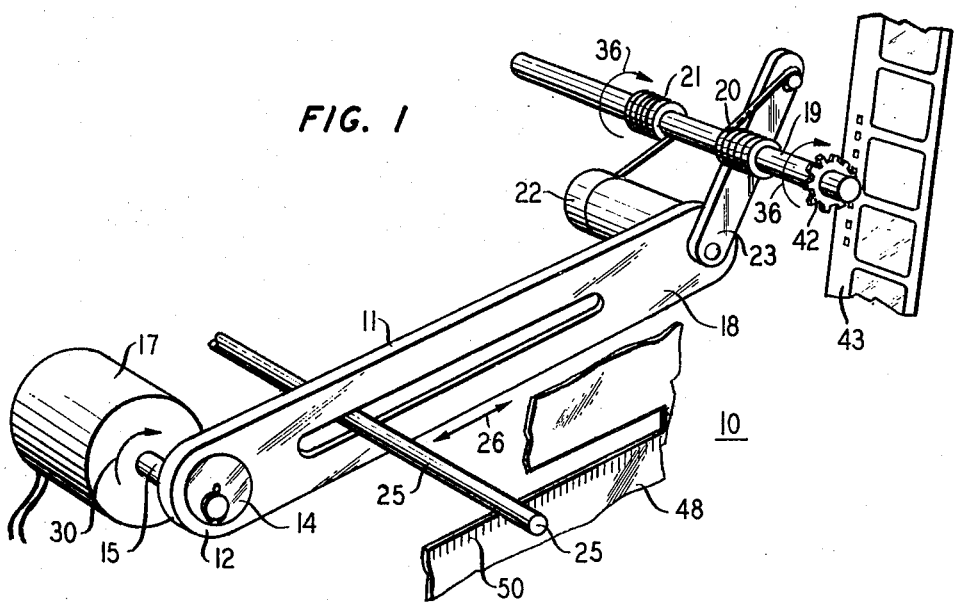
FIG. 1 is a fragmentary projection view of the wrap-spring drive arrangement in accordance with this invention.

FIG. 1 shows a wrap-spring arrangement 10 including a lever arm 11. The lever arm is coupled at a first end 12 by an eccentric (off axis) coupling 14, to the shaft 15 (hereafter "input" shaft) of an electric motor 17. A second end 18 of the lever arm is coupled to an output shaft 19 illustratively by means of first and second wire springs 20 and 21. Linkages 22 and 23 are employed, as shown, for connecting the springs to the lever and for separating the wrap points for the springs along shaft 19. A fulcrum 25 is in contact with and adjustable along lever arm 11 as indicated by double-headed arrow 26.

Figure 2:
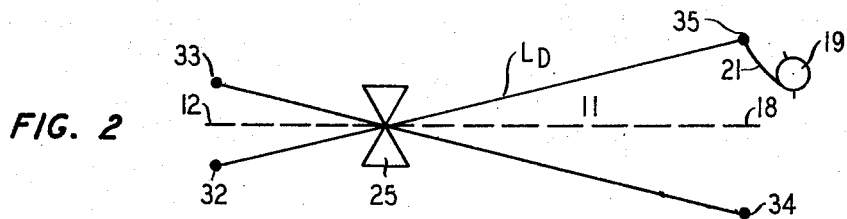
FIGS. 2, 3, and 4 are schematic illustrations of portions of the arrangement of FIG. 1 during operation.

In operation, motor 17 is turned on by, for example, toggle switch 29 to rotate input shaft 15 in, illustratively, a clockwise direction as viewed in the figure. In response, end 12 of lever arm 11 oscillates up and down. This oscillation is indicated in FIG. 2 with respect to broken line representative of the mean position (11) for lever arm 11. End 12 is indicated in the figure to be movable between extreme positions 32 and 33. Due to fulcrum 25 and in accordance with well-understood considerations, end 18 of the lever is displaced, in response, between extreme positions 34 and 35.

When end 12 of lever 11 moves to the downward position 32, as indicated in FIG. 2 by line $L_D$, end 18 moves from the mean position to the upward extreme position 35. This movement of end 18 of lever 11 turns spring 21. Because the spring wraps itself tightly around shaft 19 a clockwise rotation is applied to shaft 19 as indicated by arrow 36 of FIG. 1.

Figure 3:
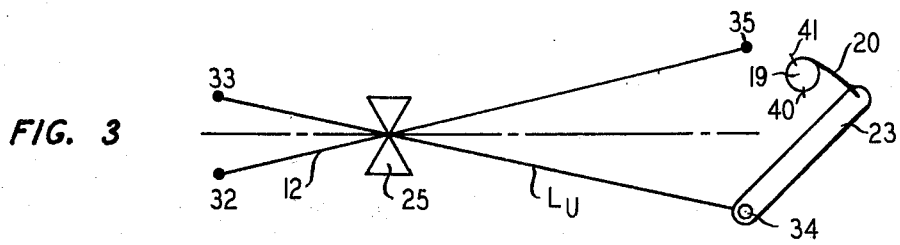

FIG. 3 shows end 12 of lever 11 in an extreme upward position at point 33, the lever arm being in position $L_U$ in this instance. End 18 therefore is in position 34. In moving from position 35, of FIG. 2, to position 34 of FIG. 3, end 18 turns spring 20, again applying a clockwise rotation to shaft 19. The wrapped-spring arrangement thus can be seen to be operative to apply successive clockwise movements to shaft 19 as input shaft 15 rotates, illustratively, clockwise.

Of course, as the downward thrust of end 18 turns spring 20 clockwise, it turns spring 21 counterclockwise causing it to slip on shaft 19. And as the upward thrust of end 18 turns spring 21, it causes spring 20 to slip. Consequently, the unwound spring, in each instance, slips with respect to shaft 19 allowing the wound spring to apply rotational motion to the shaft.

Figure 4:
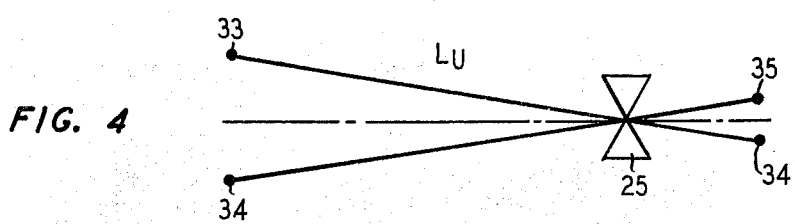

The amount of angular displacement applied to shaft 19 depends on the displacement of end 18 of the lever since this displacement determines the angular displacement of the wound spring. But that displacement is determined by the position of the fulcrum 25. FIG. 4, for example, shows the fulcrum moved closer to end 18 then it was in FIGS. 2 and 3. The displacement of end 12 of the lever remains the same. Consequently, the displacement of end 18 is reduced as indicated by the relatively small separation between points 34 and 35 in FIG. 4.

The angular displacement of shaft 19, in turn, depends on the displacement during each oscillation of end 18 of lever arm 11, given the constant angular velocity of input shaft 15. If, for example, the displacement of end 18 of the lever arm, resulting from the placement of the fulcrum 25 as shown in FIG. 3, applies sufficient movement to result in the rotation of shaft 19 from radial reference line 40 to reference line 41 in FIG. 3, then the smaller displacement shown for end 18 in FIG. 4 can be seen to result in a lesser rotation of shaft 19.

A variation in the angular velocity of output shaft 19 of a factor of 10 or more is easily achieved by use of a lever arm speed control. This is a particularly simple and inexpensive implementation for controlling, for example, the speed of film driven by a sprocket connected to shaft 19. FIG. 1 shows one such arrangement where a sprocket 42 engages a movie film 43 for speed control. A lever arm of six inches and a fulcrum adjustable over a 3 and one-half inch range permits the variation of shaft 19 from one-fourth rpm to 5 rpm with shaft 15 rotating at 20 rpm. An eccentric of one-half inches produces oscillations of end 18 of from three-sixteenths to 1 and three-sixteenths inches. Links 22 and 23 are pivotally connected to end 18 to convert the oscillations of end 18 into rotation of the springs in order for that rotary motion to be applied.

In practice, lever arm 11 is held in place by fulcrum 25 which in turn is held in place by a housing, indicated at 48. The fulcrum protrudes, at 50, as a convenient operator adjustment. The housing also secures motor 17 and shaft 19 in the relative positions shown in order to avoid movement of the axis of shaft 19.

The invention has been described in terms of two wrapped springs for driving shaft 19 and a fulcrum control for varying the incremental angular movement of shaft 19. Of course, the compression and slippage of only a single pair of springs may produce a rotation which is not sufficiently smooth, for example, for sound reproduction as in a tape drive. On the other hand, additional wrap springs can be arranged, for example, with added links such as 22 and 23 and lever arm 11 of FIG. 1, to operate out of phase with springs 20 and 21 to smooth the rotation of shaft 19 to a satisfactory level.

Considering only the motion of end 18 of lever arm 11, we seen that motion of that end in an oscillatory path is converted to rotational motions of shaft 19. From this vantage point, the lever arm and fulcrum serve, primarily, a speed control function.

What has been described is considered merely illustrative of the principle of this invention. Accordingly, various modifications thereof can be devised by those skilled in the art within the spirit and scope of the invention as encompassed by the following claims.

What is claimed is:

1. A speed control arrangement for varying the rotation imparted to an output shaft having means for driving movie film a first shaft of a power source, said arrangement comprising a lever arm having first and second ends, said first end being connected eccentrically to said first shaft in a manner to exhibit oscillations therein when said first shaft rotates, said output shaft being coupled to said second end by first and second springs wrapped about said output shaft, and a fulcrum adjustable along said lever arm for controlling the amplitude of oscillations in said second end, said first and second springs being connected to said second end in a manner to convert oscillations in said second end to rotation of said output shaft; said means for driving comprising a sprocket wheel affixed to said output shaft for driving said film.

2. A speed control arrangement in accordance with claim 1 also including means for rotating said first shaft.

* * * * *